US008850710B1

(12) United States Patent
Rodrigue et al.

(10) Patent No.: US 8,850,710 B1
(45) Date of Patent: Oct. 7, 2014

(54) INTERCONNECTABLE CONSTRUCTION LEVEL SYSTEM

(76) Inventors: Timothy J. Rodrigue, Sanford, ME (US); Scott W. Adams, Alfred, ME (US)

(*) Notice: Subject to any disclaimer, the term of this patent is extended or adjusted under 35 U.S.C. 154(b) by 302 days.

(21) Appl. No.: 13/312,421

(22) Filed: Dec. 6, 2011

(51) Int. Cl.
*G01C 9/26* (2006.01)
*G01C 9/28* (2006.01)

(52) U.S. Cl.
USPC .................................. 33/374; 33/373; 33/376

(58) Field of Classification Search
CPC .............. G01C 9/18; G01C 9/26; G01C 9/28; B43L 7/10
USPC ............ 33/373, 374, 375, 376, 451, 478, 707
See application file for complete search history.

(56) References Cited

U.S. PATENT DOCUMENTS

| | | | |
|---|---|---|---|
| 1,182,730 A * | 5/1916 | Anderson et al. ................ | 33/376 |
| 1,552,371 A * | 9/1925 | Williams ........................ | 33/376 |
| 2,383,166 A * | 8/1945 | Seiwell .......................... | 403/326 |
| 2,879,606 A * | 3/1959 | Olivere .......................... | 33/374 |
| 4,003,134 A * | 1/1977 | Adams ........................... | 33/348 |
| 5,388,338 A * | 2/1995 | Majors ........................... | 33/376 |
| 6,640,455 B1 * | 11/2003 | Smothers ........................ | 33/374 |
| 6,912,794 B2 * | 7/2005 | Hannah .......................... | 33/404 |
| 7,454,839 B2 * | 11/2008 | Della Bona et al. ............ | 33/283 |
| 7,562,463 B2 * | 7/2009 | Vaes .............................. | 33/374 |
| 7,644,506 B2 * | 1/2010 | Wong ............................. | 33/373 |
| 7,805,850 B1 * | 10/2010 | Cooper et al. .................. | 33/374 |
| 7,963,044 B1 * | 6/2011 | Bartholomew ................. | 33/374 |
| 8,104,187 B2 * | 1/2012 | Heyer ............................ | 33/375 |
| 8,286,363 B1 * | 10/2012 | Martinez ........................ | 33/613 |
| 2003/0093909 A1 * | 5/2003 | Liao .............................. | 33/375 |
| 2005/0183276 A1 * | 8/2005 | Scarborough ................... | 33/374 |

FOREIGN PATENT DOCUMENTS

| | | | | |
|---|---|---|---|---|
| DE | 10105852 A1 * | 9/2002 | ............. | G01C 9/28 |
| GB | 2278918 A * | 12/1994 | ............. | G01C 9/28 |
| GB | 2407382 A * | 4/2005 | ............. | G01C 9/26 |
| GB | 2423372 A * | 8/2006 | ............. | G01C 9/26 |
| WO | WO 03089880 A1 * | 10/2003 | ............. | G01C 25/00 |

* cited by examiner

*Primary Examiner* — Richard A Smith
(74) *Attorney, Agent, or Firm* — Robert C. Montgomery; Montgomery Patent & Design

(57) ABSTRACT

The present invention is a construction level system having interconnectable level sections and attachments that can be stored in a carrying bag. Each level section has a construction level and a pair of locking mechanisms that enable interconnections to other level sections or attachments. The locking mechanisms have mating profiles and a locking lever that enable a user to securely mate the locking mechanisms of different level sections together. The carrying bag has pockets sized to the level sections. The bag further comprises a carrying strap and a plurality of compartments for retaining small objects such as pencils and tools.

20 Claims, 16 Drawing Sheets

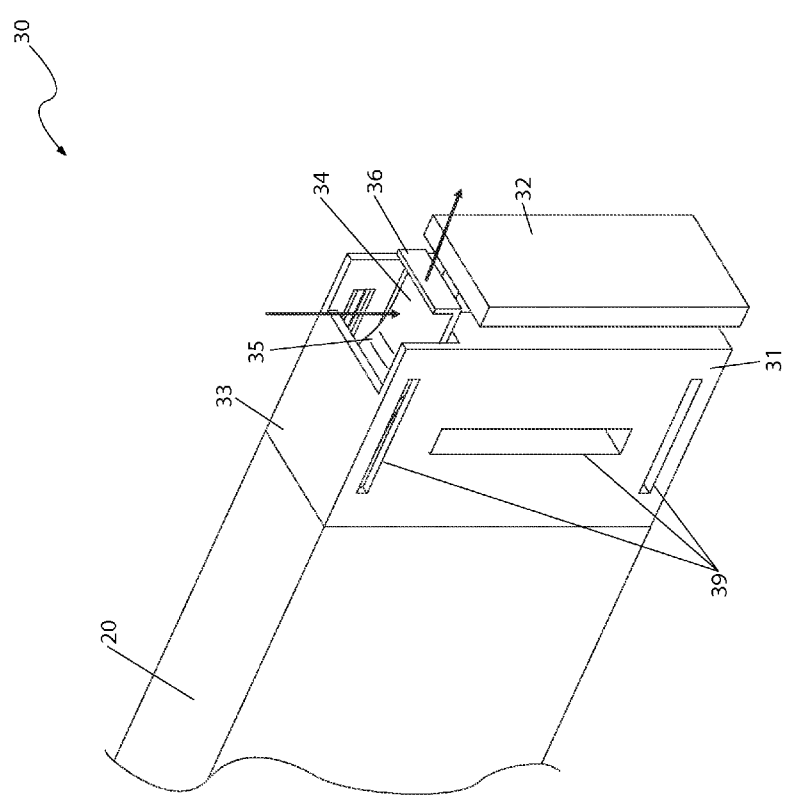

INTERCONNECTABLE CONSTRUCTION LEVEL SYSTEM

RELATED APPLICATIONS

There are currently no applications co-pending with the present application.

FIELD OF THE INVENTION

The presently disclosed subject matter is directed towards spirit (bubble) construction levels and leveling systems. More specifically, the present invention relates to construction levels that can be selectively interconnected to form a longer level or a level having special capabilities.

BACKGROUND OF THE INVENTION

The spirit construction level is one (1) of the most widely used and essential construction tools in existence. It can be used to level walls, floors, stairs, shelves, pictures, cameras, machinery and when properly configured can determine vertical alignment. The spirit construction level dates from around 1620, with a major improvement made in about 1920 that resulted in simplified operation. Modern spirit construction levels are simple in operation, low in cost, capable of very high accuracy, and flexible in application. The spirit construction level has been used successfully for generations around the world.

Construction levels usually include a rigid body comprised of a tough, lightweight material with has flat top and bottom surfaces to enable marking straight lines. A typical sprit construction level has two (2) or three (3) glass or clear plastic vials that are almost filled with a liquid, usually an alcohol. Each vial has a couple of accurately positioned marks. "Almost filled" is important because not completely filling a vial with the liquid results in a bubble. When a vial is properly installed in the body if the vial bubble rests between the marks the vial is horizontal (or vertical, depending on the orientation of the vial). If the vial is not level the bubble "floats" away from the space between the marks.

By locating and positioning the vials correctly both horizontal level and vertical level (plumb) can be determined Furthermore, it is possible to locate the bubble in a round vial and provide indicia marks around the bubble. The bubble can then be used to determine angles. By placing multiple vials in a single body a plurality of pre-selected angles can be found (such as 0°, 30°, 45°, and 90°).

While spirit construction levels have been extremely successful for generations, they are not without problems. One (1) particular problem is selecting the length of a spirit construction level. Shorter levels are easier to use than longer ones, but they are less accurate. Furthermore, longer levels can provide easier alignments and line markings. So, choosing the correct length is a problem. Another problem with prior art spirit construction levels is that their own success requires users to often carry multiple levels. Some might be longer, some shorter, some more accurate, and some might allow angle measurements. Using a multitude of construction spirit levels can be expensive and makes storage and carrying difficult.

Therefore, a construction sprit level system that can be configured as a short level and as a long level would be beneficial. Even more beneficial would be a construction sprit level system that can expand short levels into long levels. Beneficially such a construction spirit level system would enable angle measurements, vertical determination, and horizontal level. A construction sprit level useable with various attachments would also be useful.

SUMMARY OF THE INVENTION

The principles of the present invention provide for sprit construction level systems that can be configured as both short and long levels. Those principles further provide for construction sprit level systems having angle measurements, vertical determination, horizontal level and use with various attachments.

Those principles are incorporated in a construction level system having an elongated level body with two (2) ends and at least one (1) vial opening. A bubble vial is retained inside the vial opening. On one (1) end of the level body are a "T"-shaped male extension and an upper enclosure having a slide track. A slide is retained in the slide track. On the other end of the level body are a female "T" slot and a slide slot that opens into a latch. The female "T" slot and the "T"-shaped male extension are dimensioned to fit together such that the slide aligns with the slide slot.

By dimensioning the female "T" slot and the "T"-shaped male extension as described above multiple levels can be fit together to configure a construction level of a desired length. Preferably, the level body includes at least one (1) handle opening, while the slot includes a lip that snap fits into the latch, slot ears to assist sliding along the slide track, and a gripping surface. The vial can be fixed in place or made removable. If removable, the vial beneficially snaps into position within the vial opening. Preferably, at least the male end includes slots for receiving straps. A clamp can be used to clamp the construction level to an object.

As noted two (2) or more construction levels can be attached together to form one construction level. The attached construction levels can be made at right angles to form a carpenter level. To that end a cubic attachment having connected "T" slots can be used. A construction level in the form of a degree attachment with degree indicia can be one of the interconnected construction levels. Alternatively, the second construction level can be a pitch level or an extension level. A storage bag having multiple pockets can be used to store the construction level system and its attachments.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

FIG. 3a is a close-up perspective view of a male end of the construction level illustrated in FIGS. 1 and 2;

FIG. 3b is another close-up perspective view of the male end illustrated in FIG. 3a;

Figure 1:
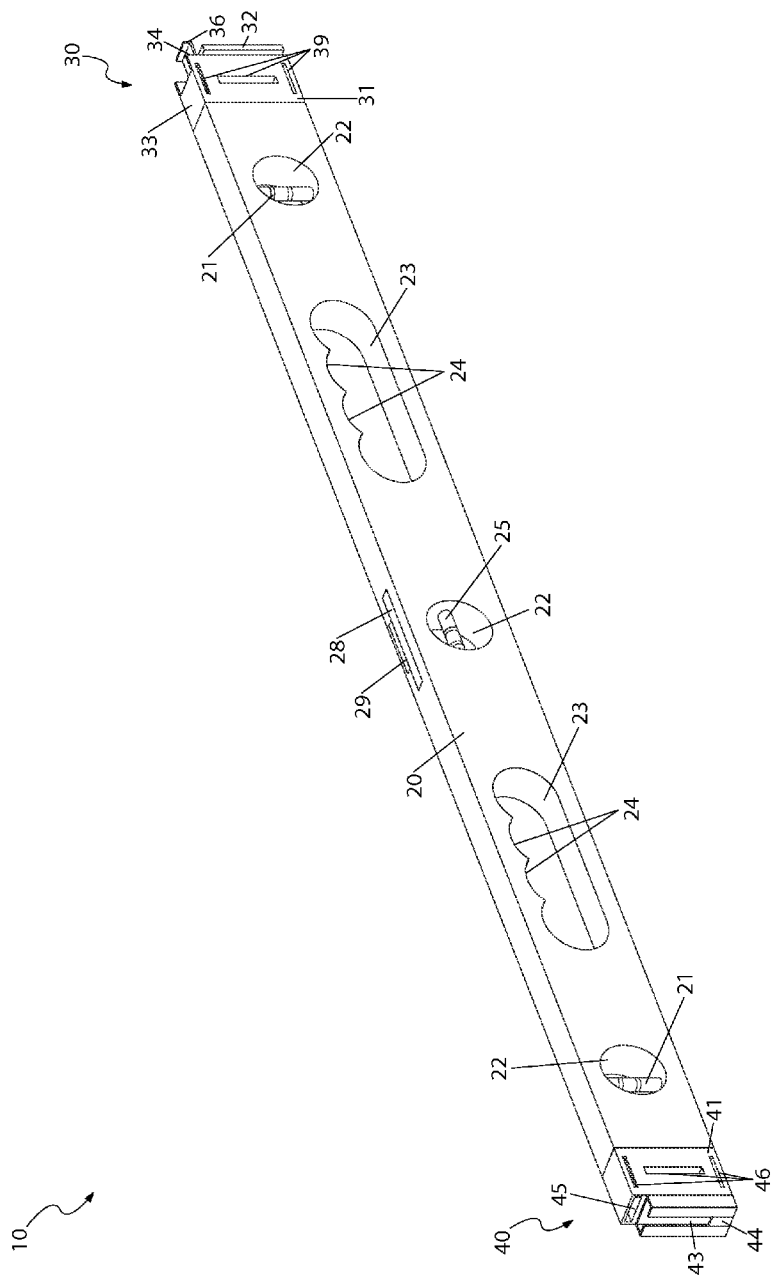
FIG. 1 is a perspective view of a construction level that is in accord with the principles of the present invention.

DESCRIPTIVE KEY 10 construction level system
20 level body
21 fixed vial
22 vial opening
23 handle opening
24 handle grip
25 removable vial
26 side panels
27 line opening
28 upper panel
29 upper panel locking feature
30 male end
31 male extension
32 tee
33 upper enclosure
34 slide
35 slide gripping surface
36 lip
37 slide ear
38 slide track
39 male end slot
40 female end
41 female extension
42 latch
43 tee-slot
44 tee-slot bottom surface
45 slide slot
46 female end slot
47 vial opening
48 locking feature opening
50 storage bag
51 exterior surface
52 upper opening
53 upper interior surface
54 upper lid
55 zipper
56 lower opening
57 lower interior surface
58 lower lid
59 length adjustable bag handle
60 pockets
61 flap
62 pocket opening
63 fasteners
70 right angle attachment
71 first slot
72 right angle second slot
75 clamp
76 first extension
77 second extension
78 adjustable knob
80 articulating pad
81 rectangular pad
82 "U"-shaped bracket
83 axle
84 pivoting brace
85 brace slot
92 strap
94 fastener
95 degree
96 degree center vial
97 degree indicia
98 bubble
99 pitch member
100 pitch level
102 pitch level vials
105 extension level
106 center vial
107 end vials
108 movable member
110 container
111 container lid

DETAILED DESCRIPTION OF THE PREFERRED EMBODIMENT

The best mode for carrying out the invention is presented in terms of its preferred embodiment, herein depicted within FIGS. 1 through 16. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The principles of the present invention provide for an interconnectable construction level system 10 that has enhanced and expandable features. As with prior art spirit construction levels the levels used in the construction level system 10 indicate to a user whether a surface or object is level or plumb. However, the construction level system 10 can provide the accuracy of prior art long construction levels and the compactness and ease of use of prior art short construction levels. The construction level system 10 also enables that use of various accessories that enable certain tasks to be preformed.

Figure 2:
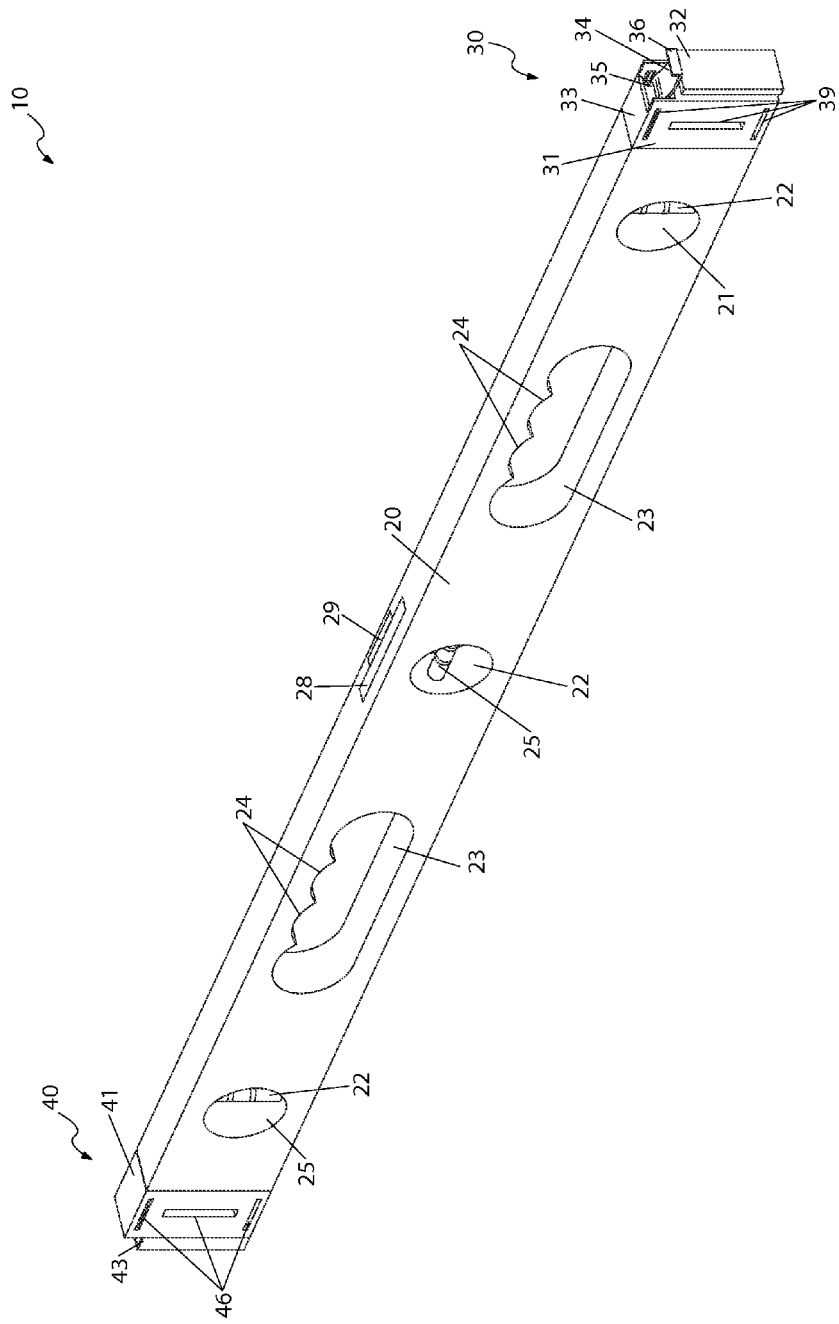
FIG. 2 is an opposing perspective view of the construction level illustrated in FIG. 1.

Refer now to FIGS. 1 and 2, which are perspective views of different sides of a construction level system 10 that is in accord with the principles of the present invention. The construction level system 10 is preferably purchased in multiples (at least pairs) to enable a user to implement a construction spirit level having a desired length. The construction level system 10 includes an elongated and generally rectangular level body 20 having two (2) ends. The level body 20 is beneficially about thirty (30) inches in length, two-and-seven-sixteenths (2⁷⁄₁₆) inches in height, and one-and-three-eighths (1⅜) of an inch in width. The level body 20 is beneficially primarily fabricated from materials such as, but not limited to: aluminum, steel, wood, plastic, or the like.

Figure 7:
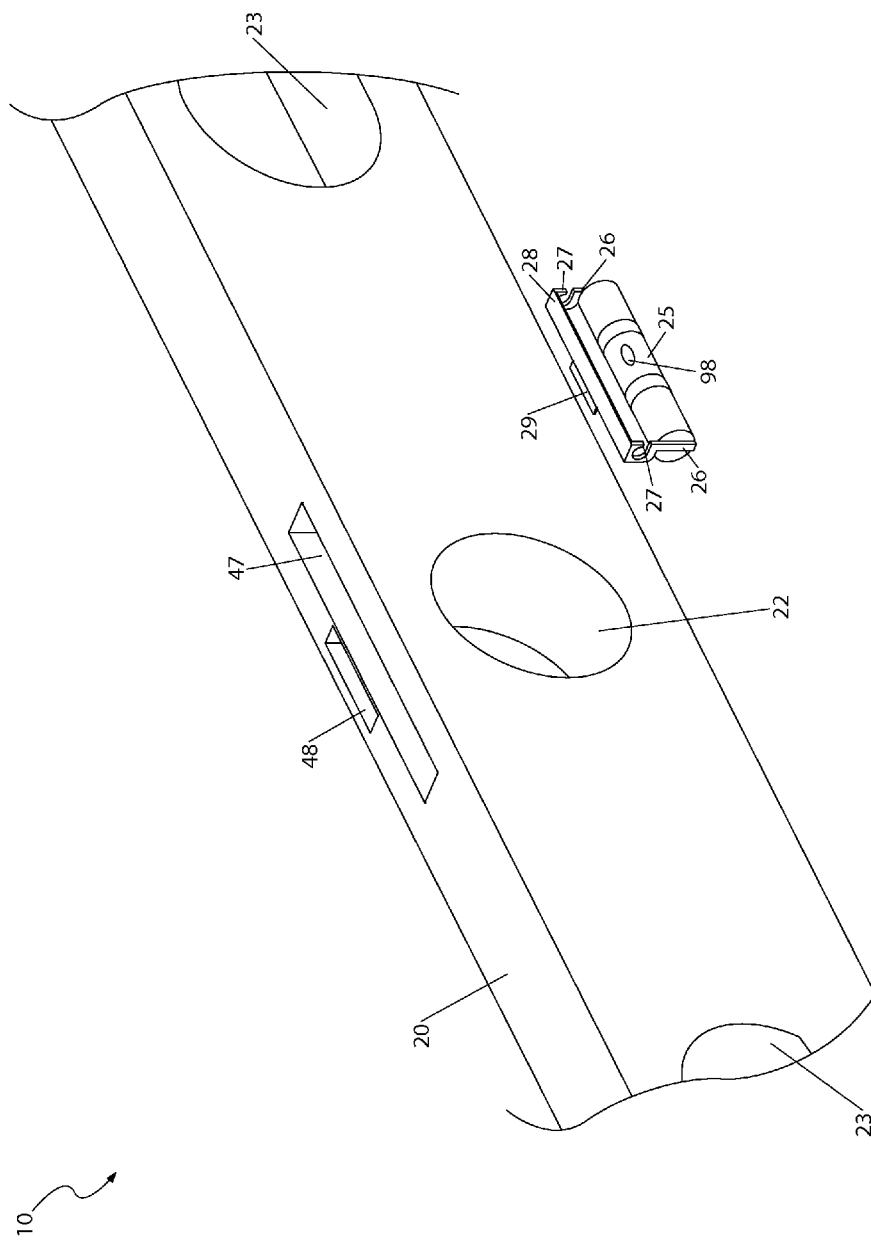
FIG. 7 is a perspective view of a removable center vial used in the construction level.

As illustrated in FIGS. 1 and 2, looking from either the front or back the level body 20 can be seen to retain a plurality of fixed vials 21 and a removable vial 25 (FIG. 7 shows the removable vial 25 in more detail). The level body 20 further includes a pair of handle openings 23. The vials 21, 25 enable a user to determine if the construction level system 10 is level or plumb while the handle openings 23 enable easy carrying and/or positioning. The fixed vials 21 are preferably positioned near opposing ends of the construction level system 10 while the removable vial 25 is preferably positioned at the middle of the construction level system 10. Ideally a user can view the vials 21, 25 from either the front or back of the level body 20.

As shown, the vials 21, 25 are positioned within vial openings 22 and are orientated at desired angles relative to the elongation axis of the level body 20. Such angles are beneficially zero (0°), forty-five (45°), and ninety (90°) degrees as is common in prior art levels. However, other orientations may be used. The vials 21, 25 are preferably comprised of glass tubes that are incompletely filled with fluid so as to create bubbles 98 (see, for example, FIGS. 4 and 7 for bubbles) within the vials 21, 25. A bubble 98 will travel to the center position of its associated vial once that vial is level or plumb. The handle opening 23 enables a user to grasp a handle grip 24 for transporting or positioning purposes. The handle grip 24 beneficially comprises an ergonomic design usable from either the front or back.

The construction level system 10 has a male end 30 (also see FIGS. 3a and 3b) on one end of the level body 20 and a female end 40 (see FIG. 4) on the opposite end of the level body 20. As is subsequently described the ends 30, 40 are configured to enable connecting multiple construction level systems 10 together. By doing so a construction spirit level having a desired length can be obtained.

Figure 3B:
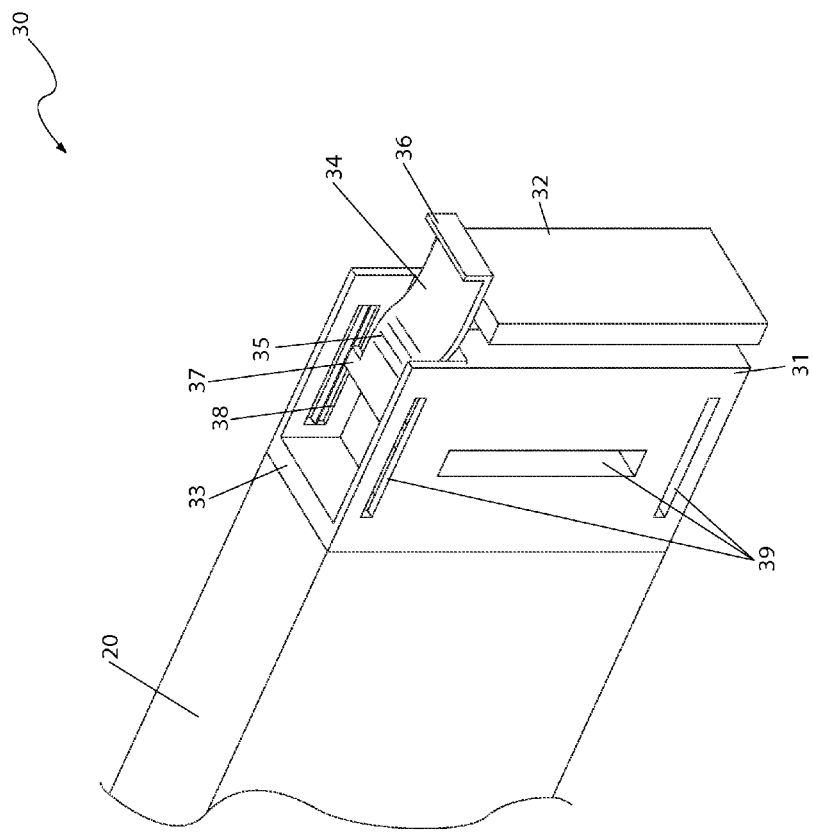

Referring now specifically to FIGS. 3a and 3b, the male end 30 has locking features which are used to engage and to lock with the female end 40 of another construction level system 10. The male end 30 includes a male extension 31 which is preferably fabricated from rubber and which is attached via an integral molding or similar techniques onto one end of the level body 20. The end of the male extension 31 includes an integrally molded tee 32 which does not span the full height of the level body 20, being slightly below the top of the level body 20 and the male extension 31. The tee 32 is configured to slidably engage and mate with a tee slot 43 (see FIG. 4 and described below) of a female extension 40.

Still referring primarily to FIGS. 3a and 3b, the male extension 31 includes an upper enclosure 33 having a slide track 38. The upper enclosure 33 houses and retains a slide 34 which can slide along the slide track 38. FIG. 3b shows the upper enclosure 33 in partial cut-away for illustrative purposes. The slide 34 has a generally rectangular shape which can be extended past the male extension 31. The slide 34 has an upwardly curved body with slide ears 37 on opposing edges and ends in a lip 36. The slide 34 further includes a slide gripping surface 35 which provides the user with a contact surface area to enable moving the slide 34 along the slide track 38.

The slide 34 can be slid out of the upper enclosure such that the lip 36 extends to engage a slide slot 45 (see FIG. 4) of the female end 40 to secure a pair of construction level systems 10 together. The slide 34 is beneficially comprised of a resilient material which enables the slide 34 to be inserted within a slide slot 45 (see FIG. 4) of the female end 40. The slide track 38 is preferably integral to inner side walls of the upper enclosure 33.

Figure 4:
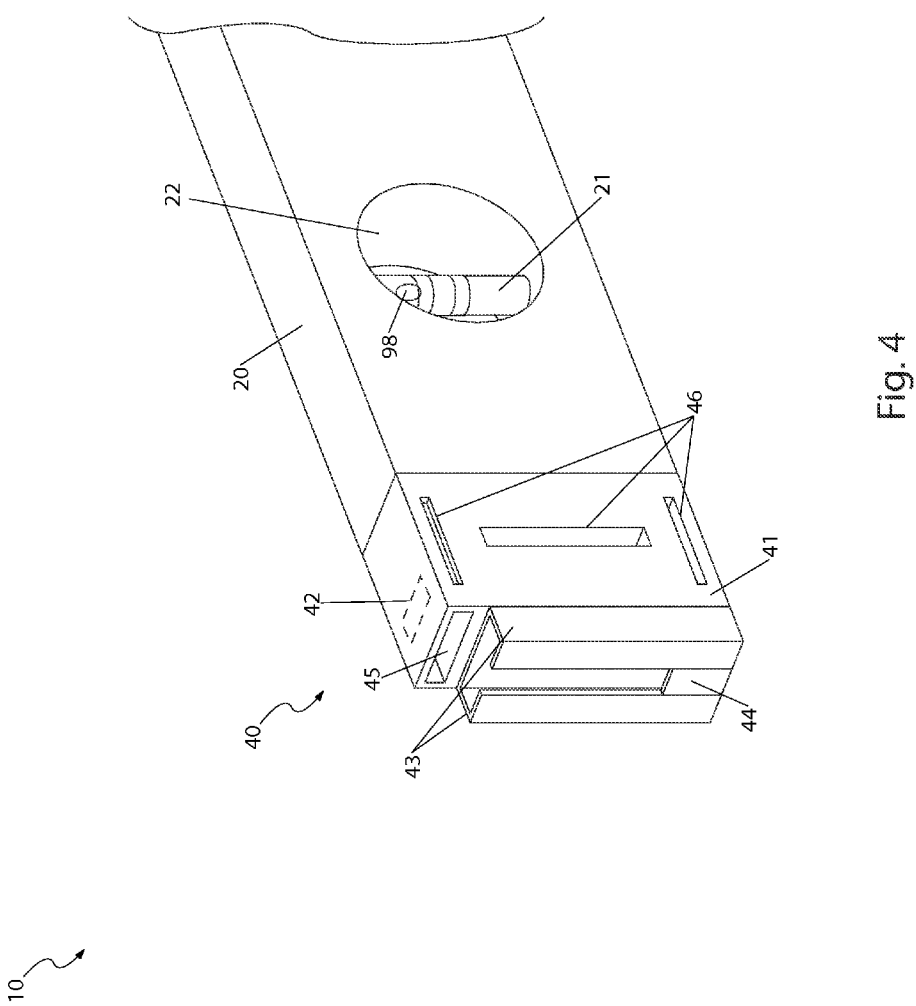
FIG. 4 is a close-up perspective view of a female end of the construction level illustrated in FIGS. 1 and 2.

Refer now to FIG. 4. On the other end of the level body 20 opposite the male end 30 (see FIGS. 3a and 3b) is the female end 40. The female end 40 is configured to connect to a male end 30 of another construction level system 10. The female end 40 has a female extension 41 which is beneficially fabricated from rubber and is attached as an integral molding or similar techniques to the level body 20. The female end 40 includes a side slot 45 that extends into a latch 42. When connecting two construction level systems 10 together the tee 32 of the male end 30 (FIGS. 3a and 3b) slides into the tee-slot 43 of the female end 40. The slide 34 is then slightly depressed and extended into the side slot 45 using the slide gripping surface 35. Eventually the lip 36 passes into the latch 42. The slide 34 is then released, the lip 36 engages the latch 42, and two construction level systems 10 are interconnected together.

In practice the tee-slot 43 and the slide slot 45 are positioned slightly below the upper surface of the female extension 41. The tee-slot 43 beneficially has a tee-slot bottom surface 44 that prohibits the tee 32 of another construction level system 10 from falling through the tee-slot 43. The tee-slot bottom surface 44 also beneficially aligns the slide slot 45 with the slide 34. The slide slot 45 is slightly larger than the slide 34 to enable proper sliding engagement.

Figure 5:
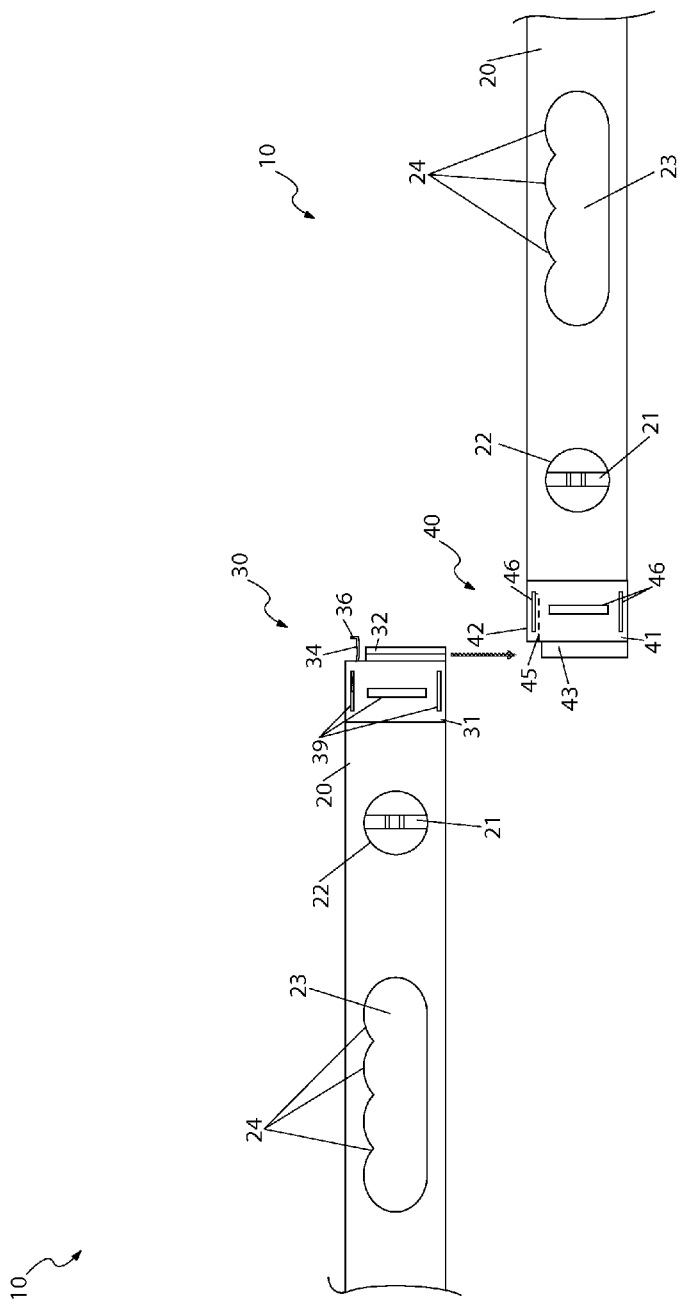
FIG. 5 is a side view of a pair of construction levels.
Figure 6:
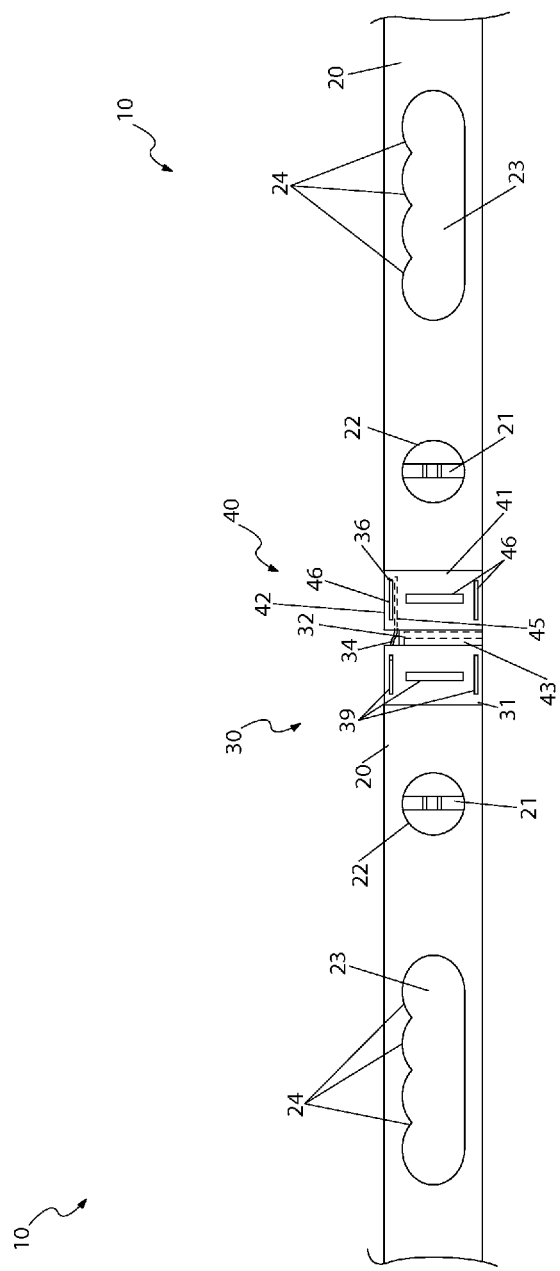
FIG. 6 is a side view of the pair of construction level illustrated in FIG. 5 after they are interconnected.

Refer now to FIGS. 5 and 6 for depictions of how to attach one (1) construction level system 10 to another construction level system 10. As shown in FIG. 5 the male end 30 of one (1) construction level system 10, specifically the one on the left, is aligned with the female end 40 of the other construction level system 10, the one on the right. The aligned end 30 and 40 are then mated, resulting in the combined system shown in FIG. 6. As the combined construction level systems 10 have an end with a male end 30 and an end with a female end 40 additional construction level systems 10 can be joined together.

FIG. 7 presents a perspective view of the removable center vial 25 that enables a user to determine a level line. While the removable vial 25 is preferably intermediately positioned other positions may be used. Opposing ends of the removable vial 25 have integral side panels 26 which enable a line to be hooked onto a pair of line openings 27 to help set the levelness of the vial 25. The removable vial 25 engages and disengages with a level body vial opening 47 upon a top intermediate portion of the level body 20. An upper panel 28 sits within the level body vial opening 47 to enable an upper panel locking feature 29 to engage and secure within a locking feature opening 48 upon a top intermediate surface of the level 20. The upper panel locking feature 29 secures the removable vial 25 into the level 20.

Figure 9:
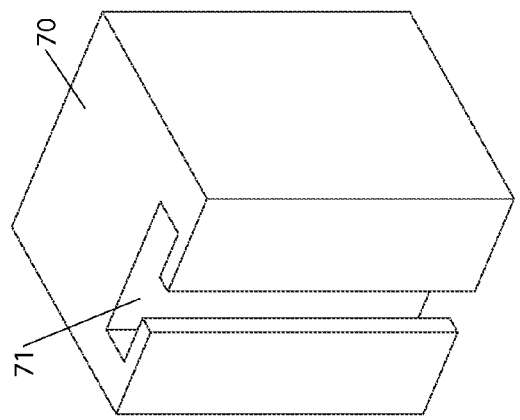
FIG. 9 is another perspective view of the right angle attachment illustrated in FIG. 8.
Figure 8:
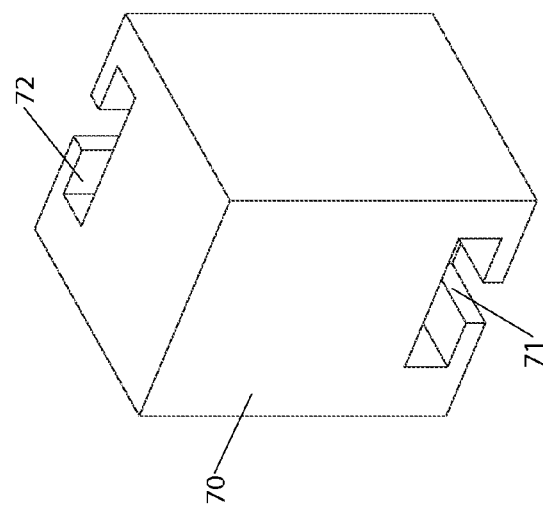
FIG. 8 is a perspective view of a right angle attachment used in the construction level.

FIG. 8 presents a perspective view of a right angle attachment 70 while FIG. 9 presents another perspective view of the right angle attachment 70 as used in the construction level systems 10. The right angle attachment 70 enables transforming a pair of construction level systems 10 into a carpenter square. The right angle attachment 70 is generally cubed shaped and includes a right angle first slot 71 and a right angle second slot 72. The right angle attachment 70 is beneficially fabricated from materials similar to or compatible with the ends 30 and 40. Each right angle slot 71, 72 has a generally "T"-shaped recess that enables the tee 32 of the male end 30 to be inserted by sliding. The right angle slots 71, 72 form a right angle. A pair of construction level systems 10 can be joined together using the right angle attachment 70 and male ends 30 to form a carpenter's square.

Figure 10:
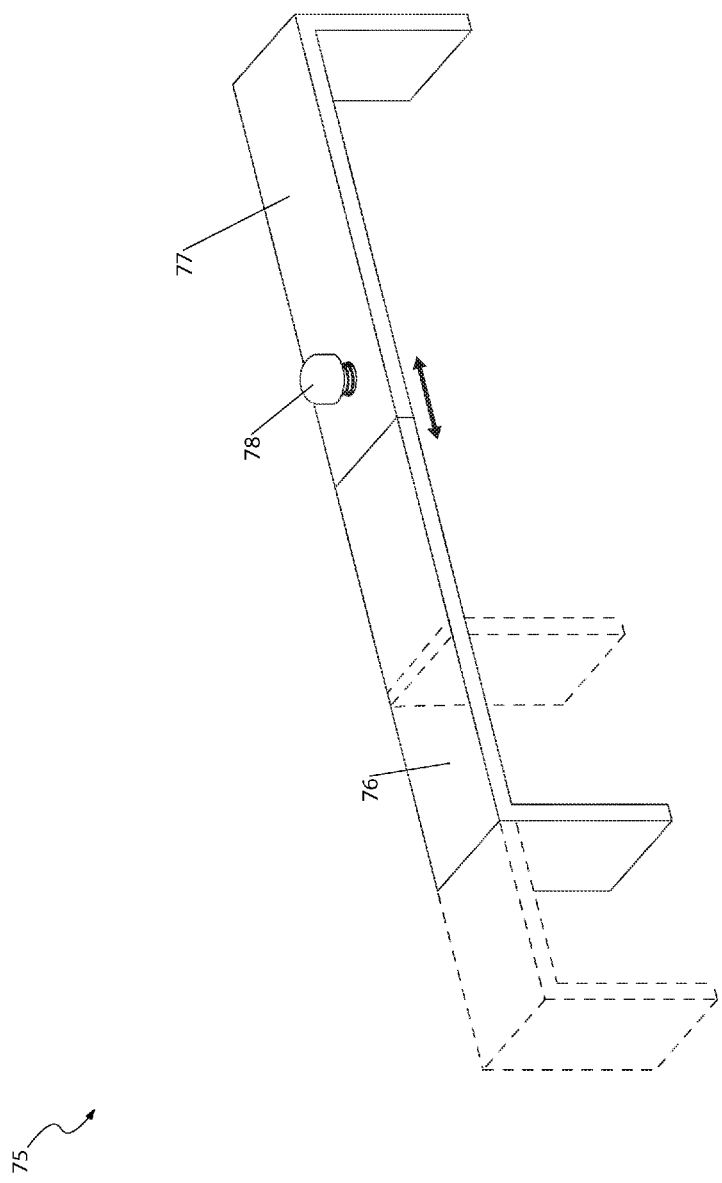
FIG. 10 is a perspective view of a clamp used in the construction level.

The construction level system 10 also includes a clamp 75 as shown in FIG. 10. The clamp 75 enables the construction level system 10 to be temporarily attached to a desired structure or surface. The clamp 75 has a first extension 76 and a second extension 77 which are comprised of opposing "L"-shaped members in which the first extension 76 slides within the second extension 77. An adjustable knob 78 is threaded into the second extension 77 to friction fit against the first extension 76 to fix the first extension 76 at a desired length. The clamp 75 is preferably fabricated from various durable materials and should be available in various lengths.

Figure 11:
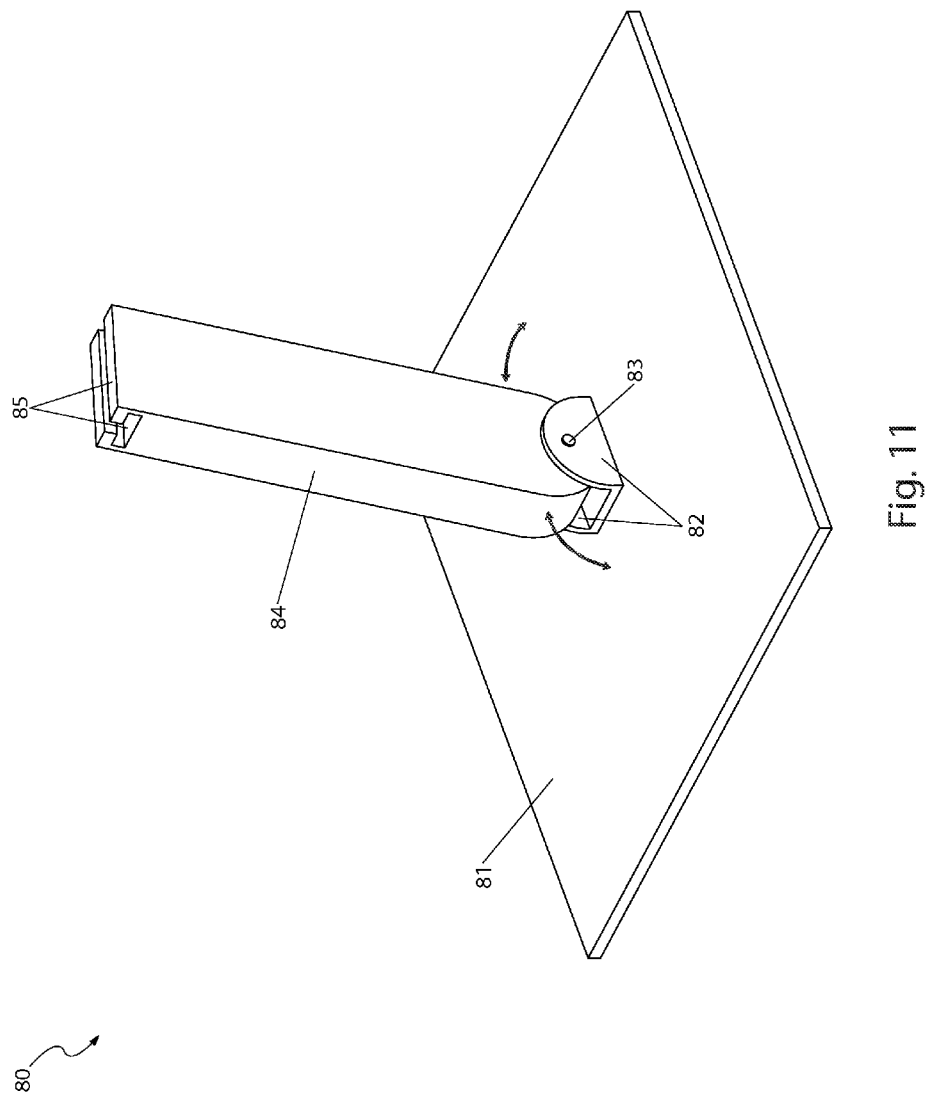
FIG. 11 is a perspective view of an attachable pad accessory used in the construction level.

FIG. 11 illustrates an articulating pad 80 used in the construction level system 10. The articulating pad 80 enables a user to attach the construction level system 10 at a desired angle. The articulating pad 80 comprises a rectangular pad 81 that is beneficially fabricated from materials such as, but not limited to: rubber, metal, or the like. At an intermediate location on the rectangular pad 81 is a "U"-shaped bracket 82 that enables attachment of a pivoting brace 84. At the proximate end of the "U"-shaped bracket 82 is an axle 83 which enables the pivoting brace 84 to pivot. The distal end of the pivoting brace 84 has a brace slot 85 which comprises a generally "T"-shaped recess that mates with the tee 32 of the male end 30.

Figure 12:
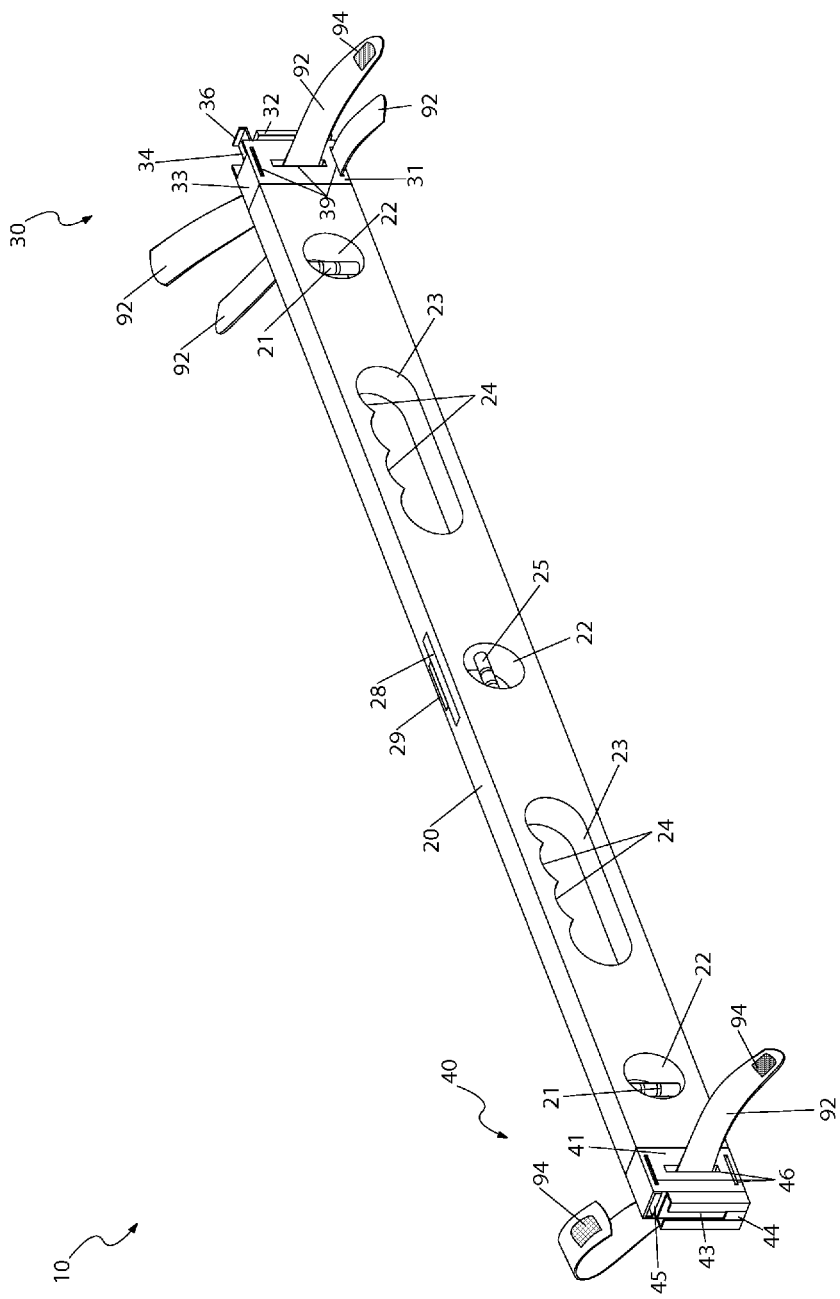
FIG. 12 is a perspective view of the construction level illustrated in FIGS. 1 and 2 and which depicts attachment straps.

FIG. 12 illustrates the use of straps 92 to attach the level body 20 to another object for leveling, such as a pipe. Each strap 92 is comprised of a durable material such as nylon and further includes a fastener 94 on each end of the strap 92. Typical fasteners include hook-and-loop fasteners, clips, snaps, and the like. The straps 92 are inserted through a male end slot 39 or a female end slot 46 to enable securing the level body 20 to the desired object. With the straps 92 passed through either end slot 39, 46 the straps 92 are wrapped around the desired object and secured with the fastener 94.

Figure 13:
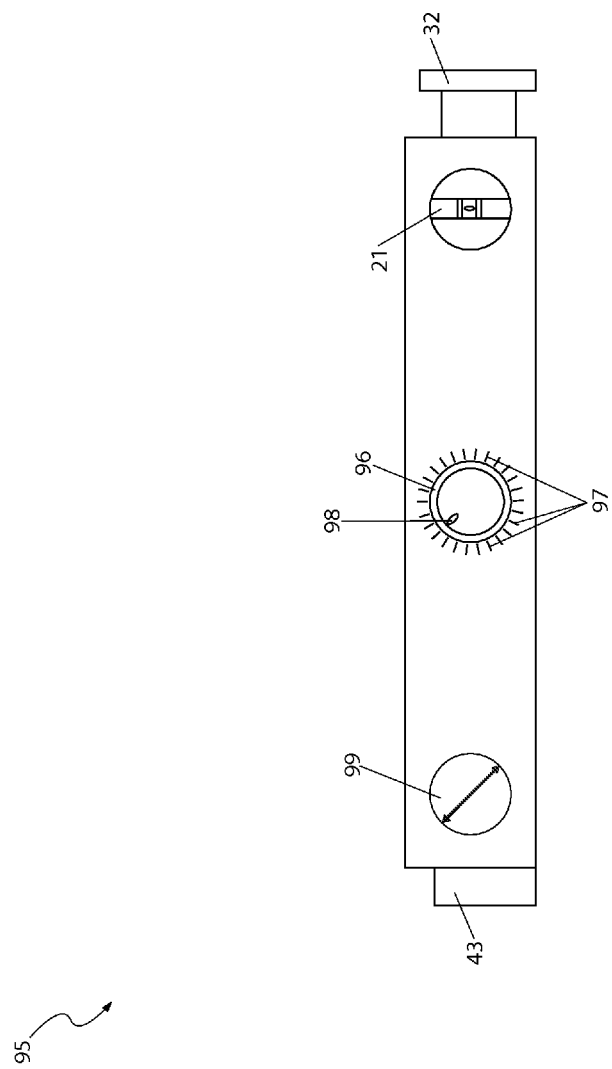
FIG. 13 is a perspective view of a degree attachment used in the construction level.

FIG. 13 is a perspective view of a degree attachment 95 that enables a user to set the tilt of the construction level system 10 to a desired angle. The degree attachment 95 comprises a degree center vial 96 and a plurality of degree indicia 97 around the degree center vial 96. The degree center vial 96 is comprised of a circular member that retains a fluid and a bubble 98. The degree indicia 97 are comprised of various alphanumeric characters which correspond to various angles which the level body 20 may be positioned. The degree attachment 95 also includes a pitch member 99 that depicts the desired angle and a tee-slot 43 that enables attachment to a male end 30. Opposing the pitch member 99 is a vial 21 that enables the user to see when the construction level system 10 is level and a tee 32 that enables attachment to a female end 40.

Figure 14:
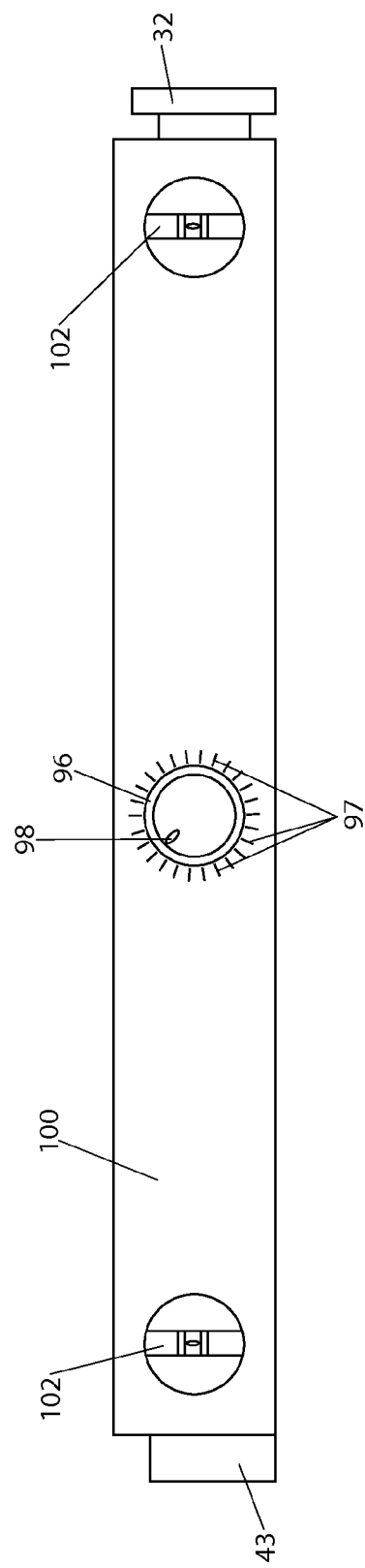
FIG. 14 is a perspective view of a pitch level used in the construction level.
Figure 15:
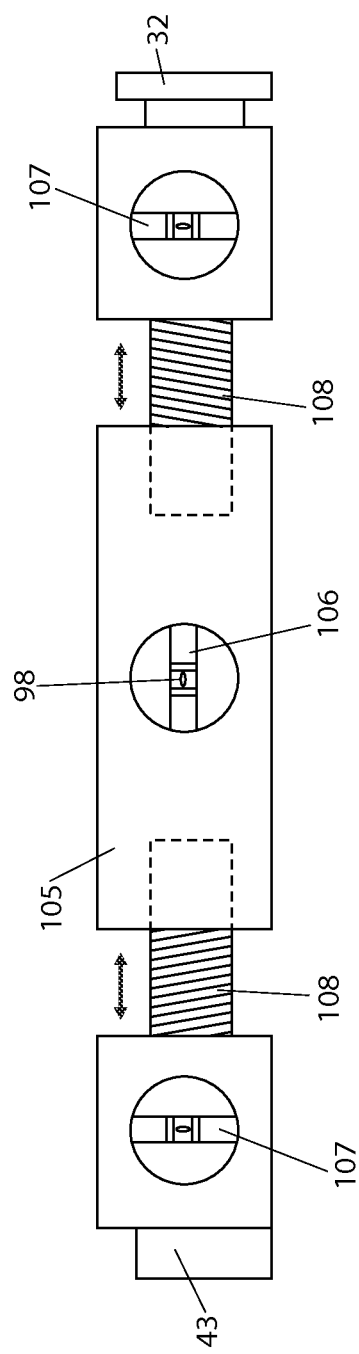
FIG. 15 is a perspective view of an extension level used in the construction level; and, FIG. 16 is a perspective view of a storage bag suitable for use with embodiments of the present invention.

FIG. 14 presents a perspective view of a pitch level 100 while FIG. 15 presents a perspective view of an extension level 105 attachments of the construction level system 10. The pitch level 100 is useful for determining the pitch of a surface using a degree center vial 96 with a bubble 98 and degree indicia 97 as described above. The pitch level 100 beneficially includes a pair of pitch level vials 102 to depict the levelness of the surface. The extension level 105 comprises a center vial 106, a pair of end vials 107 and a pair of movable members 108. The movable members are preferably comprised a toothed adjustable system capable of extending from approximately thirty-two (32) inches to forty (40) inches. One (1) end of the pitch level 100 and extension level 105 comprises a tee 32 to attach to a female end 40 of another construction level system 10 while the other end has a tee-slot 43 to attach to the male end 30 of another construction level system 10.

Figure 16:
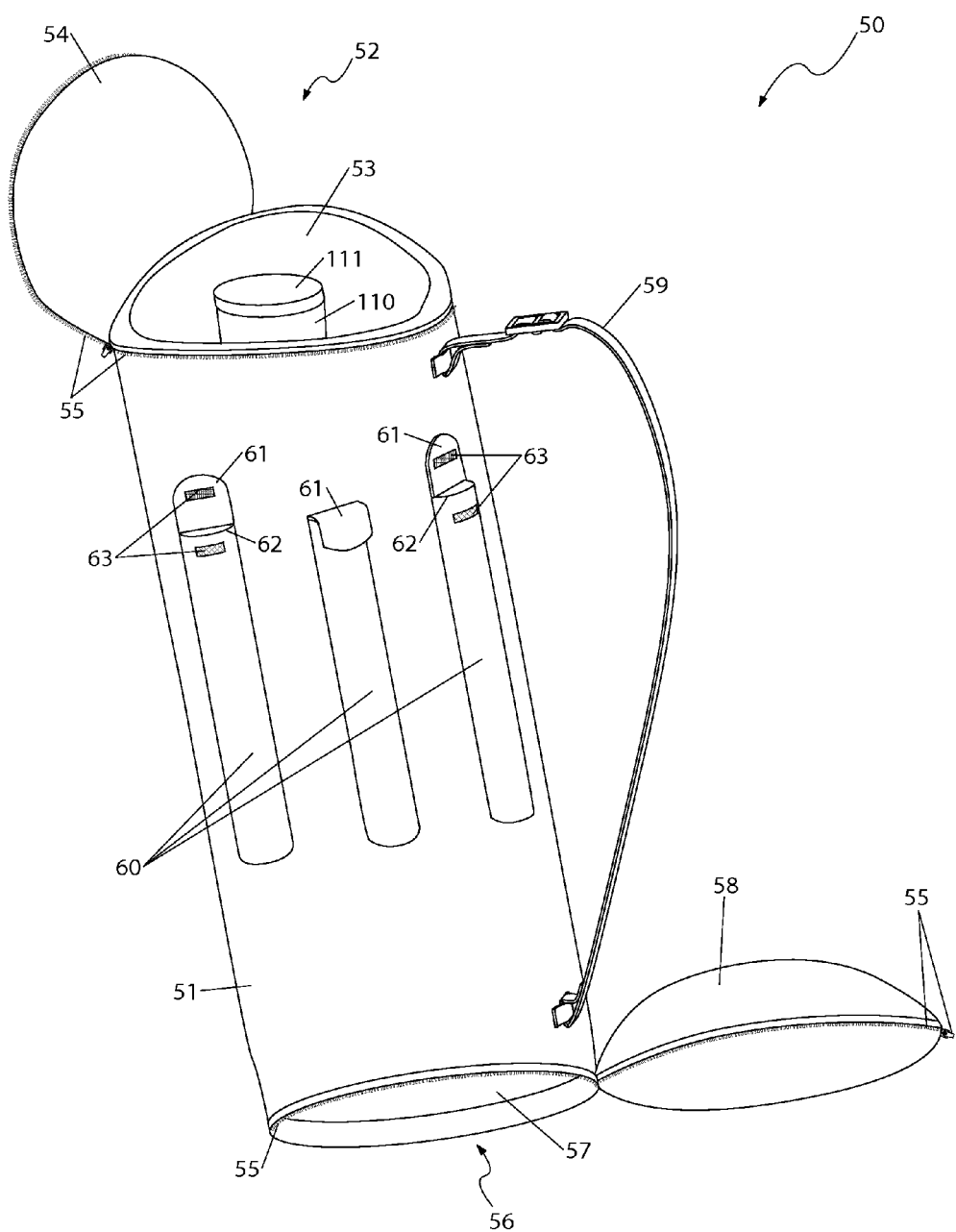

FIG. 16 presents a perspective view of a storage bag 50 of the construction level system 10. Beneficially a plurality of construction level systems 10 could be stored within a single storage bag 50. The storage bag 50 has a tubular shape and is fabricated from materials such as, but not limited to: nylon, canvas, or the like. The storage bag 50 preferably measures approximately forty (20) inches in length. An exterior surface 51 of the storage bag 50 has a length adjustable bag handle 59 that enables a user to carry or suspend the storage bag 50. The bag handle 59 is fabricated from nylon and preferably comprised a common tri-glide to adjust the length. Intermediate portions of the exterior surface 51 have pockets 60 which each retain a construction level system 10. The pockets 60 are beneficially fabricated from nylon or canvas and are attached to the exterior surface 51 by common sewing techniques. A construction level system 10 is slid into a pocket opening 62 and secured via a flap 61 and fasteners 63. The flap 61 shuts the pocket opening 62 and the fasteners 63 are preferably common hook-and-loop devices.

The storage bag 50 has an upper opening 52 which provides storage for items such as blueprints. The upper opening 52 has an upper interior surface 53 which retains a center container 110 for storing items such as blueprints. The center container 110 is beneficially fabricated from a plastic material and has a threaded container lid 111 that provide a moisture/and waterproof storage area. The center container 110 is beneficially slightly shorter than the storage bag 50 and has a diameter about five (5) inches in diameter. The upper interior surface 53 is sealed by an upper lid 54. The upper lid 54 secures to an upper perimeter of the upper opening 52 using a zipper 55. The storage bag 50 further includes a shallow lower opening 56 that enables storage of devices such as, but not limited to: writing utensils, calculators, and attachments 70, 75, 80, 95 or the like within a lower interior surface 57. The lower interior surface 57 is sealed by a lower lid 58 which secures to a lower perimeter edge of the lower opening 56 with another zipper 55.

The preferred embodiment of the present invention can be utilized by the common user in a simple and effortless manner with little or no training. After initial purchase or acquisition of the construction level system 10, it could be attached as indicated in FIGS. 5 and 6. The method of utilizing the construction level system 10 may be performed by the following steps: acquiring a construction level system 10; utilizing the handle opening 23 to transport or position the construction level system 10 to a desired location; positioning the construction level system 10 on the desired surface for leveling or plumbing; utilizing the vials 21 to determine the levelness; and, utilizing as desired.

The method of interconnecting construction level systems 10 may be achieved by performing the following steps: acquiring at least a pair of construction level systems 10; engaging the male end 30 of one (1) construction level system 10 with the female end 40 of the other construction level system 10 via aligning and sliding the tee 32 into the tee-slot 43, sliding the slide 34 within the upper opening 33 via the spring 37, and releasing the slide 34 to engage the lip 36 into the latch 42; utilizing as abovementioned; and, disconnecting the construction level system 10 when desired.

The method of installing and utilizing the storage bag 50 may be achieved by performing the following steps: acquiring the storage bag 50; unfastening the flaps 61 to access the pocket openings 62 for storing a construction level system 10 within a desired pocket 60; unfastening the upper lid 54 via the zipper 55 to access the upper interior surface 53 and storing items within the center container 110; fastening the upper lid 54 with the zipper 55 as desired; unfastening the lower lid 58 via the zipper 55 to access the lower interior surface 57 and storing items within; fastening the lower lid 58 with the zipper 55 as desired; and, transporting or suspending the storage bag 50 via the bag handle 59 as desired.

It is envisioned that other styles and configurations of the present invention can be easily incorporated into the teachings of the present invention, and only one (1) particular configuration shall be shown and described for purposes of clarity and disclosure and not by way of limitation of scope.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A construction level, comprising:
   an elongated level body having two ends and a vial opening;
   a vial having a bubble retained inside said vial opening;
   a male end on one of said two ends, said male end having a "T"-shaped male extension and an upper enclosure with a slide track;
   a slide retained in said slide track such that said slide can partially slide out of said slide track, said slide having an upwardly curved body; and,
   a female end on a second of said two ends; said female end having a female "T" slot and a slide slot that opens into a latch;
   wherein said female "T" slot is dimensioned to receive said "T"-shaped male extension such that said slide aligns with said slide slot; and,
   wherein said slide is dimensioned to slide along said slide track and into said latch.

2. The construction level according to claim 1, wherein said level body includes at least one handle opening.

3. The construction level according to claim 1, wherein said slide includes a lip dimensioned to snap fit into said latch.

4. The construction level according to claim 3, wherein said slide includes slide ears that engage said slide track.

5. The construction level according to claim 3, wherein said slide has a gripping surface.

6. The construction level according to claim 1, wherein said vial is fixed in said vial opening.

7. The construction level according to claim 1, wherein said vial is removable from said vial opening.

8. The construction level according to claim 7, wherein said vial snap-fits with said level body.

9. The construction level according to claim 1, wherein said male end includes a plurality of strap slots for enabling straps to pass through said male end.

10. The construction level according to claim 1, further including a clamp for clamping said construction level system onto an object.

11. The construction level according to claim 1, further including:
    an elongated second level body having two second ends and a second vial opening;
    a second vial having a second bubble retained inside said second vial opening;
    a second male end on one of said two second ends, said second male end having a second "T"-shaped male extension and a second upper enclosure having a second slide track;
    a second slide retained in said second slide track such that said second slide can partially slide out of said second slide track, said second slide having an upwardly curved body; and
    a second female end on a second of said two second ends; said second female end having a second female "T" slot and a second slide slot that opens into a second latch;
    wherein said female "T" slot mates with said second "T"-shaped male extension such that said second slide passes into said latch.

12. The construction level system according to claim 1, further including:
    an attachment body with two attachment ends;
    an attachment male end on one end of said two attachment ends, said attachment male end having an attachment "T"-shaped male extension and an attachment upper enclosure having an attachment slide track;
    an attachment slide retained in said attachment slide track such that said attachment slide can partially slide out of said attachment slide track, said attachment slide having an upwardly curved body; and,
    an attachment female end on a second attachment end of said two attachment ends; said attachment female end having an attachment female "T" slot and an attachment slide slot that opens into an attachment latch;
    wherein said female "T" slot is configured to mate with said attachment "T"-shaped male extension such that said attachment slide can pass into said latch and such that said attachment body can form a right angle with said level body.

13. The construction level system according to claim 1, further including a degree attachment having:
    a degree attachment body with two attachment ends and a degree vial opening;
    a degree vial having a bubble and that is retained in said degree vial opening;
    a degree attachment male end on one end of said two attachment ends, said degree attachment male end having a degree attachment "T"-shaped male extension and a degree attachment upper enclosure having a degree attachment slide track; and,
    a degree attachment female end on a second attachment end of said two attachment ends; said degree attachment female end having a degree attachment female "T" slot and a degree attachment slide slot that opens into a degree attachment latch;
    wherein said female "T" slot is configured to mate with said degree attachment "T"-shaped male extension such that said degree attachment slide track can pass into said latch, thereby removably attaching said degree attachment to said level body female end.

14. The construction level system according to claim 13, wherein said degree attachment body include a set of degree indicia.

15. The construction level system according to claim 1, further including an articulating pad, comprising:
    a flexible pad;
    a "U"-shaped bracket attached to said flexible pad, said "U"-shaped bracket having to bracket apertures;
    a pad body having a body aperture near a first end and a pad female "T" slot dimensioned to mate with said "T"-shaped male extension; and, an axle passing through said bracket apertures and said body aperture to retain said pad body to said "U"-shaped bracket.

16. The construction level system according to claim 1, further including a pitch level having:
- a pitch level body with two pitch ends and a pitch vial opening;
- a pitch vial having a pitch bubble and that is retained in said pitch vial opening;
- a pitch male end on one end of said two pitch ends, said pitch male end having a pitch "T"-shaped male extension and a pitch upper enclosure having a pitch slide track; and
- a pitch female end on a second end of said two pitch ends; said pitch female end having a pitch female "T" slot and a pitch slide slot that opens into a pitch latch;
- wherein said female "T" slot is configured to mate with said pitch "T"-shaped male extension such that said pitch slide track can pass into said latch, thereby removably attaching said pitch level to said level body female end; and
- wherein said pitch vial reads the pitch of said pitch level.

17. The construction level system according to claim 1, further including a storage bag having a plurality of pocket openings and fasteners.

18. The construction level system according to claim 1, further including a right angle adaptor comprising a substantially cubic shaped body, a first "T" slot along a first surface of said cubic shaped body, and a second "T" slot along a second surface of said cubic shaped body, wherein said first and second "T" slots connect.

19. The construction level system according to claim 1, further including an extension level, comprising:
- a extension level body;
- a movable member that extends from said extension level body;
- an extension male end on said movable member, said extension male end having an extension "T"-shaped male extension; and
- wherein said extension "T"-shaped male extension is configured to mate with said female "T" slot, thereby removably attaching said extension level to said level body female end.

20. The construction level system according to claim 19 wherein said movable member is toothed.

* * * * *